United States Patent Office 3,394,077
Patented July 23, 1968

3,394,077
HYDROREFINING IN THE PRESENCE OF LOW HYDROGEN SULFIDE PARTIAL PRESSURES
Stephen M. Kovach, Ashland, Ky., and Edward S. Rogers, Hinsdale, Ill., assignors to Sinclair Research, Inc., New York, N.Y., a corporation of Delaware
No Drawing. Filed Nov. 1, 1965, Ser. No. 505,994
10 Claims. (Cl. 208—216)

ABSTRACT OF THE DISCLOSURE

Hydrorefining of nitrogen- and/or sulfur-contaminated mineral oil hydrocarbons with the aid of a sulfided Group VIII metal-molybdenum-alumina catalyst is conducted in the presence of very low partial pressure amounts of hydrogen sulfide, e.g., at a ratio of hydrogen sulfide partial pressure to hydrogen partial pressure of about 0.0001 to 0.005:1, preferably about 0.0001 to 0.001:1.

---

This invention relates to the upgrading, through catalytic hydrorefining, of mineral oil hydrocarbon stocks. More particularly it relates to the attainment of maximum hydrogenation and denitrogenation rates during the hydrorefining by maintaining advantageous hydrogen sulfide partial pressures in the catalyst contact zone.

The presence of sulfur and nitrogen in mineral hydrocarbon oils has long been recognized as undesirable. Nitrogen compounds have a poisoning effect as they often tend to reduce or destroy the activity of catalysts employed to convert, e.g., crack, these stocks. The higher the nitrogen content of the charge stock, the higher will be the temperature required to effect a given amount of conversion, eventually requiring more frequent regeneration or replacement of the catalyst. Sulfur compounds are highly objectionable in hydrocarbon oils as they have an unpleasant odor, tend to cause corrosion, and often lead to sludging.

In the past the major portion of crude oil available to the petroleum industry was sweet, there being little or no sulfur or nitrogen compounds present. In time the supply of sweet crude decreased and new crude discoveries yielded sour crudes. Today the major portion of the domestic crude supply contains nitrogen and sulfur compounds. These poisons are especially high in some sources such as California crude and shale oil-derived stocks.

These difficulties have led to various proposals for desulfurization and denitrogenation of almost all petroleum, coal tar and shale oil hydrocarbons which are normally liquid or which can be made fluid at treating temperatures, including light distillates, middle and heavy distillates and even residual stocks.

Early attempts to upgrade nitrogen and sulfur contaminated stocks included methods such as acid treatment and deasphalting. More recently the emphasis has been placed upon hydrogenolysis of the oils in contact with a catalytic material such as cobalt and nickel molybdates, cobalt and nickel tungstates, molybdenum and tungsten oxides and sulfides, etc. Such hydrogen treatment has become commonly known as hydrorefining or hydrofining. The effect of the treatment is that the nitrogen and sulfur compounds present in the feed are converted, primarily, to ammonia and hydrogen sulfide. Condensation of the reactor effluent then allows for a simple separation of the gaseous contaminants from the liquid hydrocarbon products. In addition to the nitrogen and sulfur removal, the hydrorefining results in the removal of oxygen impurities and the hydrogenation of unsaturated, i.e., olefinic and aromatic, hydrocarbons in the feed.

When the hydrorefining process is applied to sulfur-containing feeds it is usually beneficial to employ hydrogenation catalysts wherein the catalytically active metal components are in chemical combination with sulfur. The effect of employing the metals in their sulfide forms is a lessening of their susceptibility to poisoning by the sulfur compounds of the feed. Similarly, the prior art has known that in order to prolong the life of the hydrorefining catalysts, whether previously sulfided or not, the hydrogen-rich gases in the catalytic contact zone should contain minor amounts of hydrogen sulfide. In order to maintain the desired hydrogen sulfide concentration, techniques have been employed such as adding $H_2S$ or an $H_2S$-releasing material or recycling the $H_2S$-rich effluent gases to the contact zone when the $H_2S$ level would otherwise be too low, or, when the sulfur content of the feed is high enough to produce a sufficient concentration of $H_2S$, removing $H_2S$ from the gaseous effluent and recycling the substantially $H_2S$-free gases. These methods of maintaining a desired concentration of hydrogen sulfide in the catalytic contact zone are conventional and well-known in the art.

The essence of the present invention lies in the discovery that when hydrorefining with sulfided hydrogenation catalysts comprising molybdenum, a metal of Group VIII of the Periodic Table and a predominantly alumina support, increased hydrogenation and/or denitrogenation activity will be effected by operating at lower $H_2S$ to $H_2$ ratios than contemplated by the prior art. Whereas prior teachings, in regard to the control of $H_2S$ concentration during hydrorefining, dictate that, in order to achieve optimum performance when employing any conventional hydrorefining catalyst, the $H_2S$ level should be maintained in the range of 1 to 10 volume percent of the hydrogen-containing gases in the hydrorefining zone, it has now been found that generally higher activities are exhibited by the above selected catalysts when operating at considerably lower $H_2S$ to $H_2$ partial pressure ratios, in the order of 0.0001 to 0.005:1, preferably 0.0001 to 0.001:1. These partial pressure ratios refer to those conditions present in the hydrotreating zone; so that, whereas the hydrogen partial pressure is based on the amount of hydrogen fed into the zone, the hydrogen sulfide partial pressure is effected by a combination of the amount of $H_2S$, if any, which is fed to the zone and the amount of $H_2S$ which is produced through hydrogenation of sulfur impurities in the hydrocarbon feed.

The hydrocarbon stock may be one of a variety of petroleum, shale oil, tar sand and coal tar fractions, including base stocks for lubricants, lighter petroleum distillates such as a gas oil for catalytic cracking and hydrocracking, wax distillates from paraffinic crudes, catalytically cracked distillates and the like. Frequently, the hydrorefining process of this invention is useful for upgrading mineral oil hydrocarbons having sulfur contents from about 0.1 to 5 percent by weight of the oil.

Operable catalysts for the process of this invention are those containing molybdenum and a Group VIII metal, e.g., Co, Ni, Rh, Pd, Ir and Pt, on a predominantly activated alumina support. The metals are present on the support in catalytically-active amounts; frequently, for example, the catalyst will include molybdenum in a range of about 8 to 20 weight percent and the Group VIII metal, or metals, in a range of about 1 to 6 percent. Minor amounts, e.g. about 1 to 10 percent, of other catalytically-active metals may also be included, such as the metals of Groups III–B, V–B, VI–B and VII–B of the Periodic Table. The alumina support may likewise contain minor amounts of other carrier materials employed in hydrogenation catalysts; for example, inorganic oxides such as boria, silica, titania, and magnesia.

The catalytic metals of the hydrogenation catalyst, prior to hydrorefining, are converted to their sulfide forms, in which state they are particularly active and less susceptible to poisoning by a sulfur containing feed. The sulfiding step is conventional and generally comprises passing hydrogen sulfide, either pure or diluted with another gas such as, for instance, hydrogen, over a bed of the metal-activated catalyst at temperatures usually from about 400 to 800° F. for a time sufficient to convert a significant portion of the catalytic metals to their sulfide forms. Alternatively, the catalyst may be sulfided by the processing of a high sulfur containing feed. After the sulfiding step, air should be excluded from the catalyst.

With the exception of the novel concentrations of hydrogen sulfide maintained during the hydrorefining, the hydrogenation conditions employed in the present process are conventional. Often temperatures of about 400 to 800° F., preferably 500 to 750° F. are used. Other conditions may include a pressure of from about atmospheric to 10,000 pounds per square inch gauge, preferably from 100 to 3,000 p.s.i.g.; a weight hourly space velocity (WHSV) of about 0.1 to 10, preferably 0.25 to 5, and a molar ratio of hydrogen to hydrocarbon feed of about 1 to 20:1, preferably from 1 to 10:1. The catalyst may be in any suitable shape or size; for example, as powders or microspheres passing about 200 mesh (Tyler) for fluidized-bed operations, or as rough granules, pellets or tablets when using fixed-bed reactors.

The improvements in hydrogenation and denitrogenation rates of the catalysts of the present invention which are realized by hydrorefining at the low $H_2S$ concentrations are shown by the examples hereinbelow.

These tests were performed as batch operations in a 300 cc. Autoclave Engineers Magnedrive packless autoclave. The exact weight of catalyst was crushed and screened to 30 mesh or finer and placed in the bomb. Pretreatment of the catalyst consisted of evacuation of the bomb with house vacuum and pressuring with 250 p.s.i.g. hydrogen sulfide for 10 minutes at room temperature with stirring (600 r.p.m.). The system was depressed to 50 p.s.i.g. hydrogen sulfide and heating started with stirring. The temperature was raised from room temperature to 600° F. overnight (ca. 16 hours). At the point that stirring was stopped, the proper amount of hydrogen sulfide was admitted or removed to attain proper $H_2S/H_2$ ratio. Hydrogen was then admitted to a total pressure of 1000 p.s.i.g., 95 ml. of hydrocarbon pressured from a blowcase to the bomb and the stirring was restarted. The system was such that a pressure of 1000 p.s.i.g. hydrogen was on the contents of the bomb at all times. At intervals of 30 minutes or multiples thereof a small sample (2–3 ml.) was withdrawn from the bomb and a refractive index taken on the sample. When the refractive index reached 1.5800 (represents approximately 50% hydrogenation to the Tetralin stage with Decalin production nil) the heat, hydrogen, and stirring were shut off and the bomb was cooled to room temperature. The bomb was dismantled and the hydrocarbon separated from the catalyst by filtration. Products were submitted for total N (p.p.m.) analyses to determine denitrogenation activity.

EXAMPLE I

Conditions: 600° F., 1,000 p.s.i.g., 1,000 r.p.m. stirring 3 g. catalyst
Feed: 95 ml. 1-methylnaphthalene+100 p.p.m. N as Quinoline

| Catalyst | 4% Ni-16% $MoO_3$-$Al_2O_3$ | | | | |
|---|---|---|---|---|---|
| $H_2S$, p.s.i. | 1.1 | 11 | 26 | 60 | 250 |
| $H_2S/H_2$ | .001 | .011 | .026 | .063 | *.327 |
| Time (min.) to reach $1.5800_D^{25}$ | 115 | 162 | 192 | 222 | 290 |
| Relative Rates: | | | | | |
| Hydrogenation | 1.93 | 1.37 | 1.15 | 1.0 | 0.77 |
| Denitrogenation | 2.04 | 1.39 | 1.30 | 1.0 | 0.85 | ure of 750 p.s.i.g.

In Example I is shown the effect of hydrogen sulfide partial pressure on the hydrogenation-denitrogenation activity of a sulfided nickel-molybdena on alumina catalyst. It is evident that as one progresses from low to high concentrations of $H_2S$ in the hydrorefining zone, hydrogenation and denitrogenation activities decrease rapidly. Thus with Ni-$MoO_3$/$Al_2O_3$ the activity at about 0.1 partial pressure percent of $H_2S$ is approximately 100 percent greater with respect to both hydrogenation and denitrogenation than the activity obtained at about the 6% $H_2S$ level.

EXAMPLE II

Conditions: 600° F., 1,000 p.s.i.g., 1,000 r.p.m. stirring 3 g. catalyst
Feed: 95 ml. 1-methylnaphthalene+100 p.p.m. N as Quinoline

| Catalyst | 3% Ru-16% $MoO_3$-$Al_2O_3$ | | | 3% Pt-16% $MoO_3$-$Al_2O_3$ | |
|---|---|---|---|---|---|
| $H_2S$, p.s.i. | 1.1 | 60 | 250 | 1.1 | 60 |
| $H_2S/H_2$ | .001 | .063 | *.327 | .001 | .063 |
| Time (min.) to reach $1.5800_D^{25}$ | 195 | 200 | 230 | 170 | 203 |
| Relative Rates: | | | | | |
| Hydrogenation | 1.14 | 1.11 | 0.97 | 1.31 | 1.09 |
| Denitrogenation | 1.44 | 1.18 | 1.11 | 1.53 | 1.09 |

*Hydrogen admitted to a total pressure of 750 p.s.i.g.

The effect of low $H_2S$ concentrations on the activities of the two precious metal catalysts of Example II, although not as dramatic as with the nickel-molybdena catalyst of Example I, was still significant, especially so in regard to denitrogenation activities. Again the catalyst activities increased in inverse proportion to the partial pressure of $H_2S$, with the highest hydrogenation-denitrogenation rates being exhibited in those runs employing approximately 0.1% $H_2S$.

EXAMPLE III

Conditions: 600° F., 1,000 p.s.i.g., 1,000 r.p.m. stirring 3 g. catalyst
Feed: 95 ml. 1-methylnaphthalene+100 p.p.m. N as Quinoline

| Catalyst | 3% Co-3% Mn-15% $MoO_3$-$Al_2O_3$ | | | | |
|---|---|---|---|---|---|
| $H_2S$, p.s.i. | 1.1 | 26 | 60 | 250 | 250 |
| $H_2S/H_2$ | .001 | .026 | .063 | .246 | *.327 |
| Time (Min.) to reach $1.5800_D^{25}$ | 194 | 195 | 204 | 195 | 224 |
| Relative Rates: | | | | | |
| Hydrogenation | 1.14 | 1.14 | 1.09 | 1.14 | .99 |
| Denitrogenation | 1.22 | 1.17 | 1.13 | 1.27 | 1.69 |

*In this run hydrogen was admitted to a total pressure of 750 p.s.i.g. rather than 1,000 p.s.ig.

This example compares the hydrogenation and denitrogenation activities at varying $H_2S$ concentrations when using a cobalt-manganese molybdena on alumina catalyst. The denitrogenation activity exhibited at low $H_2S$ levels, i.e., about 0.1% (column 1), is once again greater than that resulting from the use of approximately 2% and 6% $H_2S$ levels (2nd and 3rd columns) as instructed by the prior art; the hydrogenation activity, meanwhile, being the same or slightly greater. It is noted too that the maximum denitrogenation activity for the catalyst of this example is realized at extremely high $H_2S$ concentrations, in the order of a $H_2S$ to $H_2$ ratio of 1/3. Hydrogenation activity is on the decline at these high $H_2S$ levels, however.

In order to emphasize or maximize hydrogenation, denitrogenation or desulfurization, the process of this invention may employ the specified catalysts in various combinations with each other as well as singly. The important aspect is that the level of concentration of hydrogen sulfide in the hydrorefining zone be maintained by suitable techniques within the previously defined limits.

It is claimed:

1. In a process for hydrorefining a mineral oil hydrocarbon to remove therefrom one or more contaminants selected from the group consisting of nitrogen compounds and sulfur compounds wherein said hydrocarbon is contacted with a mixture of hydrogen and hydrogen sulfide under hydrogenation conditions in the presence of a sulfided hydrogenation catalyst consisting essentially of molybdenum, a metal of Group VIII of the Periodic Table and a predominantly activated alumina support, the improvement which comprises maintaining in the hydrorefining zone a ratio of hydrogen sulfide to hydrogen partial pressure of from about 0.0001 to 0.005:1.

2. The process of claim 1 wherein the hydrogenation conditions include a temperature of 500 to 750° F.

3. The process of claim 2 wherein the ratio of hydrogen sulfide to hydrogen partial pressures in the hydrorefining zone is from 0.0001 to 0.001:1.

4. The process of claim 3 wherein the catalyst is a sulfided nickel-molybdena-alumina catalyst.

5. The process of claim 3 wherein the mineral oil hydrocarbon contains about 0.1 to 5 weight percent of sulfur.

6. The process of claim 3 wherein the Group VIII metal is selected from the group consisting of cobalt, nickel, ruthenium and platinum.

7. The process of claim 6 wherein the hydrogenation conditions include a pressure of about atmospheric to 10,000 p.s.i.g., a weight hourly space velocity of about 0.1 to 10 and a molar ratio of hydrogen to said hydrocarbon of about 1 to 20:1.

8. The process of claim 7 wherein the catalyst contains about 8 to 20 weight percent of molybdenum and about 1 to 6 weight percent of the Group VIII metal.

9. The process of claim 8 wherein the hydrogenation conditions include a pressure of about 100 to 3000 p.s.i.g., a weight hourly space velocity of about 0.25 to 5 and a molar ratio of hydrogen to said hydrocarbon of about 1 to 10:1.

10. The process of claim 9 wherein the catalyst is a sulfided nickel-molybdenum-alumina catalyst.

References Cited
UNITED STATES PATENTS

| | | | |
|---|---|---|---|
| 2,914,470 | 11/1959 | Johnson et al. | 208—264 |
| 3,132,090 | 5/1964 | Helfrey et al. | 208—89 |
| 3,206,387 | 9/1965 | Smilski | 208—264 |

DELBERT E. GANTZ, *Primary Examiner.*